(12) United States Patent
Galaffu et al.

(10) Patent No.: US 9,560,869 B2
(45) Date of Patent: Feb. 7, 2017

(54) FOOD COMPOSITION COMPRISING DESFERRICHRYSIN

(71) Applicant: NESTEC S.A., Vevey (CH)

(72) Inventors: Nicola Galaffu, Ornex (FR); Edwin Alberto Habeych Narvaez, Lausanne (CH); Thang Ho Dac, Le Mont s/Lausanne (CH); Magalie Sabatier, Lausanne (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 14/761,177

(22) PCT Filed: Jan. 17, 2014

(86) PCT No.: PCT/EP2014/050916
§ 371 (c)(1),
(2) Date: Jul. 15, 2015

(87) PCT Pub. No.: WO2014/111532
PCT Pub. Date: Jul. 24, 2014

(65) Prior Publication Data
US 2015/0335050 A1    Nov. 26, 2015

(30) Foreign Application Priority Data

Jan. 18, 2013 (EP) .................................. 13151956

(51) Int. Cl.
| | | |
|---|---|---|
| *A23L 1/304* | (2006.01) | |
| *A23L 1/272* | (2006.01) | |
| *A23C 9/13* | (2006.01) | |
| *A23C 9/133* | (2006.01) | |

(52) U.S. Cl.
CPC .................. *A23L 1/272* (2013.01); *A23C 9/13* (2013.01); *A23C 9/133* (2013.01); *A23C 9/1322* (2013.01); *A23K 20/111* (2016.05); *A23K 20/137* (2016.05); *A23K 20/30* (2016.05); *A23L 5/41* (2016.08); *A23L 5/42* (2016.08); *A23L 7/117* (2016.08); *A23L 19/09* (2016.08); *A23L 21/10* (2016.08); *A23L 33/105* (2016.08); *A23L 33/16* (2016.08); *A23L 33/165* (2016.08); *A23V 2002/00* (2013.01)

(58) Field of Classification Search
CPC ........ A23L 1/272; A23L 1/3002; A23L 1/304; A23L 1/2751; A23L 9/1322; A23C 9/13; A23C 9/133
USPC .................................. 426/74, 615, 266, 268
See application file for complete search history.

(56) References Cited

U.S. PATENT DOCUMENTS

| | | |
|---|---|---|
| 6,998,143 B1 | 2/2006 | Sher et al. |
| 2003/0232040 A1 | 12/2003 | Beckman et al. |
| 2004/0170728 A1 | 9/2004 | Baldwin et al. |

FOREIGN PATENT DOCUMENTS

| | | |
|---|---|---|
| EP | 1704871 | 9/2006 |
| JP | 2012162566 | 8/2012 |
| WO | 0167897 | 9/2001 |

*Primary Examiner* — Helen F Heggestad
(74) *Attorney, Agent, or Firm* — K&L Gates LLP

(57) ABSTRACT

The present invention relates to a food composition. In particular the invention relates to a non-beverage food composition comprising desferrichrysin, iron, phenolic chromophore compounds and culinary fruit. Further aspects of the invention are the use of desferrichrysin to prevent color change in an iron fortified food product and a process for fortifying a food product with iron.

20 Claims, No Drawings

FOOD COMPOSITION COMPRISING DESFERRICHRYSIN

CROSS REFERENCE TO RELATED APPLICATIONS

The present application is a National Stage of International Application No. PCT/EP2014/050916, filed on Jan. 17, 2014, which claims priority to European Patent Application No. 13151956.3, filed on Jan. 18, 2013, the entire contents of which are being incorporated herein by reference.

The present invention relates to a food composition. In particular the invention relates to a non-beverage food composition comprising desferrichrysin, iron, phenolic chromophore compounds and culinary fruit. Further aspects of the invention are the use of desferrichrysin to prevent colour change in an iron fortified food product and a process for fortifying a food product with iron.

Billions of people around the world suffer from 'hidden hunger' or micronutrient malnutrition. They do not get enough of the micronutrients required to lead healthy productive lives from the foods that they eat. Micronutrients are vitamins and minerals (such as vitamin A, zinc, and iron) and are absolutely essential to good health. Micronutrient malnutrition can lower IQ, cause stunting and blindness in children, lower resistance to disease in both children and adults, and increase risks for both mothers and infants during childbirth. Iron deficiency is the most common and widespread nutritional disorder in the world. As well as affecting a large number of children and women in developing countries, it is the only nutrient deficiency which is also significantly prevalent in industrialized countries. In wealthier countries people may voluntarily choose a diet which may cause a reduced iron intake, such as a vegetarian diet. Food fortification is one method to increase iron intake along with dietary diversification and enhancement of iron absorption.

Unfortunately, fortifying foods with iron can lead to a number of undesirable changes in the properties of the food, for example iron can accelerate oxidation reactions adversely altering the food's flavour and it can also form complexes with phenolic chromophore compounds, leading to an unwanted colour change in the food. A chromophore is a region of a molecule where the energy difference between two different molecular orbitals is such that visible light can be absorbed by exciting an electron from its ground state into an excited state. Phenolic chromophore compounds have at least one phenol structure as part of the chromophore. Examples of phenolic chromophore compounds include anthocyanins, anthocyanidins, betanin, gallic acid, curcumin and carminic acid.

The interaction between iron ions and phenolic chromophores can cause a change in the maximum absorption wavelength. Typically this is a change to a longer wavelength, such a change being referred to as a bathochromic shift. The light absorption intensity may also increase; this is the hyperchromic effect. For food comprising phenolic chromophore compounds, a bathochromic shift due to the addition of iron causes the food to change colour, which is generally undesirable.

The problem of colour change when fortifying food with iron is particularly apparent with food compositions containing culinary fruit. The colour of many culinary fruits is derived from phenolic chromophore compounds and so addition of iron leads to a bathochromic shift in the colour of the phenolic chromophore compounds resulting in an undesirable change in the colour of the food. Culinary fruits are the fleshy seed-associated structure of a plant that are sweet and edible in the raw state, such as apples, oranges, grapes, strawberries and bananas. Culinary fruits are often eaten as desserts in European cultures. Culinary fruit includes fruits from cultivated varieties of plants which produce seedless fruits such as seedless grapes and common varieties of bananas. The term culinary fruit is distinct from fruits in a botanical sense. For example, cucumbers, tomatoes, beans, nuts and cereal grains, although botanically classified as fruits, are not culinary fruits.

Culinary fruit intrinsically provides a good source of beneficial dietary nutrients, and so is a good basis for delivering additional nutritional benefits to food. There is therefore a need to provide iron fortified food compositions containing culinary fruit which do not exhibit undesirable colour changes.

EP1011344 describes chocolate-flavoured beverage mixes and other edible mixes that are fortified with sources of iron such as ferrous fumarate and ferrous sulphate, yet do not develop undesirable gray colour when the beverage mix is reconstituted with aqueous liquids including fruit juice. The problem of gray colour development is solved by including edible acids such as citric or malic acid as buffering agents in the beverage mix so that the pH of the reconstituted chocolate beverage is about 6.5 or less. Controlling the pH to be acidic does not always suit the desired taste of the product. Also, controlling the pH is generally most suitable for beverages, where any coloured components are generally dissolved or dispersed in a continuous aqueous phase and so can be influenced by added acids. For non-beverage food compositions it may be difficult to ensure that all the components responsible for the development of an undesirable colour are affected by added acids.

WO97/15201 discloses colour-stable iron fortified fruit flavoured dry drink mixes where the iron is added as ferric sulphate encapsulated in solid fats, or as iron chelated with amino acids. However, it may not always be desirable to add solid fats into food; and iron chelated with amino acids is more expensive than many other iron compounds.

EP1704871 discloses food formulations containing ferrichrysin, but does not disclose food compositions containing culinary fruits. Nor does it address the problem of iron fortification of food products without a colour change.

There remains a need to provide improved or alternative food compositions which provide a nutritional source of iron without exhibiting undesirable colour changes. In particular there is a need to provide non-beverage food compositions comprising culinary fruit which provide iron with good bioavailability, stabilized against colour change by ingredients from natural sources.

An object of the present invention is to improve the state of the art and to provide a solution to overcome at least some of the inconveniences described above or at least to provide a useful alternative. Any reference to prior art documents in this specification is not to be considered an admission that such prior art is widely known or forms part of the common general knowledge in the field. As used in this specification, the words "comprises", "comprising", and similar words, are not to be interpreted in an exclusive or exhaustive sense. In other words, they are intended to mean "including, but not limited to".

The object of the present invention is achieved by the subject matter of the independent claims. The dependent claims further develop the idea of the present invention.

Accordingly, an aspect of the present invention provides a non-beverage food composition comprising desferrichrysin, iron, phenolic chromophore compounds and culinary fruit. Further aspects of the invention are the use of desferrichrysin to prevent colour change in an iron fortified food product and a process for fortifying a food product with iron comprising preparing a non-beverage food product containing culinary fruit and adding ferrichrysin.

Desferrichrysin (sometimes called desferri-ferrichrysin) is the ligand component of ferrichrysin, which is produced by *Aspergillus oryzae* during the manufacture of koji [S. Suzuki et al., Int. J. Vitam. Nutr. Res., 77, 13 (2007)]. Desferrichrysin chelates iron to form ferrichrysin, formula (I).

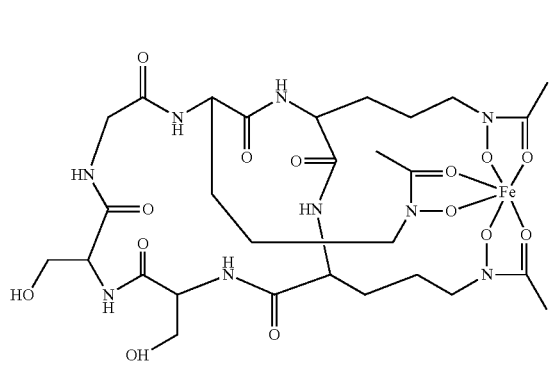

(I)

Ferrichrysin may be present in the traditional Japanese beverage sake. The *Aspergillus oryzae* strain used in sake fermentation produces high yields of ferrichrysin. Generally, sake producers try to avoid having ferrichrysin in sake as it can cause an unwanted red colour.

The inventors surprisingly found that iron, together with desferrichrysin, may be used to fortify food materials containing phenolic chromophore compounds without causing the problems of colour change usually experienced with iron fortification. For example, a strawberry and banana yoghurt fortified with ferrichrysin (iron complexed with desferrichrysin) showed a similar colour change to a strawberry and banana yoghurt with no added iron when stored at 37° C. for 120 days; whereas yoghurts fortified with other iron salts such as ferrous sulphate showed much greater colour changes under the same conditions.

Consequently the present invention relates in part to a non-beverage food composition comprising desferrichrysin, iron, phenolic chromophore compounds and culinary fruit. The iron may be present at a level of at least 1 parts per million by weight in the composition, for example at least 5 parts per million. The desferrichrysin may be present at a level of at least 20 parts per million by weight in the composition, for example at least 100 parts per million. The phenolic chromophore compounds may be comprised within the culinary fruit, or they may be added separately, for example, a natural colour such as carmine added to improve the colour.

The culinary fruit may be for example selected from the group consisting of blackcurrant, cranberry, elderberry, red currant, boysenberry, grape, cherry, orange, lemon, lime, mandarin, tangerine, grapefruit, pineapple, mango, *papaya*, passion fruit, kiwifruit, guava, fig, date, apple, plum, strawberry, raspberry, blueberry, blackberry, apricot, pear, banana, quince, wolfberry and mixtures of these. The culinary fruit may be fruits having a sugars content in their fresh ripe state greater than 4 wt %. For example, strawberries have on average 6 g sugars per 100 g edible portion [The Composition of Foods, McCance and Widdowson, $6^{th}$ Edition] so have 6 wt % sugars.

The phenolic chromophore compounds may contribute to the colour of the food composition. In the scope of the current invention the phenolic chromophore compounds contribute to the colour of the food composition if removing substantially all the phenolic chromophore compounds from the food composition would cause a difference in colour of sufficient magnitude that a human observer would perceive the difference between two samples shown one after the other but not simultaneously. For example, phenolic chromophore compounds contribute to the colour of the food composition where removing all the phenolic chromophore compounds would lead to a change in colour having a $\Delta Eab^*$ value greater than 2, for example greater than 3, measured on the CIE 1976 L*a*b* colour scale.

The CIE 1976 L*a*b* (hereinafter CIELAB) colour scale is one method of measuring colour proposed by the Commission Internationale de l'Eclairage (CIE) [CIE Technical Report, Colorimetry $2^{nd}$ Edition, CIE 15.2-1986, corrected reprint 1996]. The CIELAB colour space is produced by plotting the quantities L*, a*, b* in rectangular coordinates. The L* coordinate of an object is the lightness intensity as measured on a scale from 0 (black) to 100 (absolute white). The a* and b* coordinates have no specific numerical limits. The parameter a* runs from pure green (negative a*) to pure red (positive a*), while b* runs from pure blue (negative b*) to pure yellow (positive b*).

In the CIELAB colour space, colour difference may be calculated as a single value taking into account the differences between the L*, a* and b* values of two samples. The colour difference $\Delta Eab^*$ is calculated as follows:

$$\Delta Eab^* = \sqrt{(\Delta L^*)^2 + (\Delta a^*)^2 + (\Delta b^*)^2}$$

The term non-beverage food composition is used in the current specification to mean food compositions which are not drinks. Drinks are liquids consumed for refreshment or nourishment and include alcoholic and non-alcoholic drinks, carbonated drinks, fruit or vegetable juices and hot drinks such as coffee or tea.

Desferrichrysin is generally obtained from bacterial fermentation, for example the fermentation of *Aspergillus melleus* or *Aspergillus terreus* as described in U.S. Pat. No. 3,342,795 or the fermentation of *Aspergillus oryzae* [S. Suzuki et al., Int. J. Vitam. Nutr. Res., 77, 13 (2007)]. The desferrichrysin of the invention may be comprised within a fermentation broth. The term fermentation broth refers to the culture medium resulting after fermentation of bacteria, including the bacteria and/or its component parts; unused raw substrates; and metabolites produced by the bacteria during fermentation. The bacteria may have been at least partially removed from the broth after fermentation, for example by filtration or centrifugation. The fermentation broth may be a concentrated fermentation broth. The desferrichrysin may be comprised within a dehydrated fermentation broth, the dehydrated broth being in the form of a powder.

The desferrichrysin of the present invention may be in the form of ferrichrysin, being complexed with iron. Fortifying a food composition with iron without the problems of colour change can conveniently be achieved by adding the iron and desferrichrysin complexed together as ferrichrysin. Adding iron and desferrichrysin to a food composition separately may sometimes lead to an unwanted colour change, especially if the iron and desferrichrysin are not evenly distributed in the composition. Iron ions (ferrous or ferric ions)

may encounter phenolic chromophore compounds and cause a bathochromic shift before the iron can be bound by the desferrichrysin. It is advantageous to be able to fortify food with ferrichrysin as ferrichrysin provides a good source of bioavailable iron, being well absorbed in the organs of the body [S. Suzuki et al., Int. J. Vitam. Nutr. Res., 77, 13 (2007)].

The phenolic chromophore compounds of the invention may be selected from the group consisting of curcumin; carminic acid; polyphenols, including anthocyanins, anthocyanidins and gallic acid; and mixtures of these. These compounds are commonly found in foods. The phenolic chromophore compounds may be comprised within other ingredients, for example gallic acid in banana puree, anthocyanins in blueberries or curcumin in turmeric. Alternatively, the phenolic chromophore compounds may be added directly as a colour, for example carminic acid added in the form of carmine which is an aluminium salt of carminic acid commonly used as a food colour. The phenolic chromophore compounds of the invention may be those commonly found in culinary fruit, for example the phenolic chromophore compounds of the invention may be selected from the group consisting of polyphenols, including anthocyanins, anthocyanidins and gallic acid; and mixtures of these. The phenolic chromophore compounds of the invention may be anthocyanins.

Problems of colour change in iron-containing products frequently occur over time, reducing the acceptable shelf-life of the product, or they occur when the product is heated, for example during a sterilization or pasteurization processes. The invention provides a means to prevent undesirable colour changes during heat treatment. The non-beverage food composition of the invention may have a $\Delta Eab^*$ value less than 3, for example less than 2, after a heat treatment of 2 minutes at 105° C.

The greater the quantity of phenolic chromophore compounds in a food composition, the greater the potential colour change will be in the presence of iron. The phenolic chromophore compounds may be present in an amount between 0.0005 and 5 wt % of the composition The non-beverage food composition of the invention may comprise culinary fruit at a level of at least 1 wt. % in the food composition, for example at a level of at least 2 wt. %, for further example at a level of at least 5 wt. %. The maximum level of culinary fruit may be close to 100 wt. %, for example a fruit purée fortified by ferrichrysin at 0.015% would contain 99.985 wt. % fruit if there were no other ingredients. For processed fruits such as dried fruit or fruit powder, 1 wt. % means 1% by weight of fresh fruit equivalent. The culinary fruit may, for example, be in the form of fresh fruit, fresh fruit pieces, fruit powder, dried fruit, or fruit purée. Culinary fruit provides beneficial dietary nutrients, such as vitamins and minerals together with dietary antioxidants such as polyphenols. These strong nutritional credentials make food compositions comprising culinary fruit a suitable vehicle for further fortification, such as with iron. Culinary fruit can also add attractive texture and colour to food compositions. The culinary fruit may be selected from the group consisting of strawberry, raspberry, blueberry, blackberry, apricot, pear, banana, quince, wolfberry and mixtures of these.

The food composition of the present invention may be predominantly sweet rather than savoury, preferably sweetened by intrinsic sugars in the culinary fruit. Savoury foods often have a high salt (sodium chloride) content. Salt is present in foods in different amounts, but consuming too much can have adverse effects on health. For example, the food composition of the present invention may contain 140 mg of sodium or less per 100 g. The U.S. Food and Drug Administration define meals and main dishes to be "low in sodium" if they contain 140 mg or less of sodium per 100 g.

The food composition of the invention may further comprise yoghurt. Yoghurt is a good source of calcium, helping to form and maintain strong bones. Yoghurt may also be fortified with other beneficial minerals such as magnesium and zinc. However, fortifying yoghurt with iron presents a problem if the yoghurt contains phenolic chromophore compounds, such as may be found in yoghurts containing culinary fruit. For example, a blueberry yoghurt, coloured by the anthocyanins in blueberries, will change colour after addition of iron; the anthocyanins undergoing a bathochromic shift. Similarly a banana yoghurt, which was initially a pale yellow colour, may develop an unattractive grey-blue colour on addition of iron. Bananas comprise polyphenols such as gallic acid, catechin, epicatechin and epigallocatechin. It is an advantage that the invention provides iron fortified food compositions comprising yoghurt where these colour change problems do not occur.

A further aspect of the invention is the use of desferrichrysin to prevent colour change in an iron fortified food product. Some changes in appearance can be detected by appropriate instruments but would not be of concern to someone consuming a product. The term "colour change" in this specification may be considered to be a difference in colour of sufficient magnitude that a human observer would perceive the difference between two samples shown one after the other but not simultaneously. For example, a colour change may be considered to be a CIELAB $\Delta Eab^*$ colour difference greater than 2, for example greater than 3. An iron fortified food product is a food product in which the content of iron has been increased in the food, normally to improve its nutritional quality. The iron may, or may not have been originally in the food. Iron may be added in the form of Fe(II) or Fe(III) ions. Desferrichrysin may be used according to the invention in the form of ferrichrysin, being complexed with iron.

Desferrichrysin may be used according to the invention to prevent colour change over the product's shelf-life. For example, the CIELAB $\Delta Eab^*$ colour difference between an iron fortified food product at the time of its manufacture and the end of its shelf-life under recommended storage conditions may be less than 3, for example less than 2. Shelf life is the recommended length of time that foods, beverages, and many other perishable items can be stored during which the defined quality of a specified proportion of the goods remains acceptable under expected (or specified) conditions of distribution, storage and display. Typically a "best before date" (BBD) is printed on packaged perishable foods together with recommended storage conditions. Where such a BBD is indicated, the shelf-life is the time between manufacture and the BBD. Where a BBD is not indicated, the shelf-life is the equivalent period usual for the relevant product type.

Desferrichrysin may be used according to the invention to prevent colour change during heat treatment of the product. For example, the iron fortified food product may have a $\Delta Eab^*$ value less than 3, for example less than 2, after a heat treatment of 2 minutes at 105° C.

The iron fortified food product may be a biscuit, cake or pastry product; a cereal bar; a breakfast cereal; an ice cream product; a dessert; a prepared meal; a nutritional supplement or a pet food product. All of these products may pose problems of colour change when fortified by iron. For example biscuit, cake and pastry products may be coloured by natural colours such as anthocyanins or carmine; the products may have coloured fillings or coatings. Breakfast cereals may contain culinary fruit, for example fruit inclusions or fruit fillings. Cereal bars may contain coloured culinary fruit such as cranberries, or have coloured inclusions containing added vitamins and minerals, such as small chewy pieces of jelly. Ice creams and desserts may be coloured by anthocyanins, particularly when fruit flavoured. Prepared meals and nutritional supplements may contain culinary fruits for example in the form of fruit powder, or may be coloured by the addition of natural colours to make them more appealing. Pet foods such as dog treats may contain culinary fruit, for example berries. All these products may be sensitive to colour change on addition of iron. It is therefore an advantage that desferrichrysin may be used in these products to achieve iron fortification whilst preventing colour change, for example colour change caused by a bathochromic shift.

The non-beverage food compositions of the invention may be red in colour. Ferrichrysin itself has a slight red/orange colour and so is particularly unnoticeable in red coloured compositions. "Red" within the scope of the present invention refers to a CIELAB hue angle $h_{ab}$ between 335° and 80°. An angle between 335° and 80° refers to all the angles between 335° and 360° and all the angles between 0° and 80°, (0° and 360° being equivalent). Red materials with A high lightness intensity may be described as pink. The hue angle $h_{ab}$ is calculated from a* and b* values as:

$$h_{ab} = \arctan(b^*/a^*)$$

where $h_{ab}$ lies between 0° and 90° if b* and a* are both positive, between 90° and 180° if b* is positive and a* is negative, between 180° and 270° if b* and a* are both negative, and between 270° and 360° if b* is negative and a* is positive.

Desferrichrysin may be used to prevent colour change in an iron fortified food product comprising fruit, such as culinary fruit. For example, desferrichrysin may be used to prevent colour change in an iron fortified food product comprising fruit purée or fruit yoghurt. It is beneficial to be able to fortify fruit purées and fruit yoghurts with vitamins and minerals. Fruit purées and fruit yoghurts are suitable foods for infants and young children, with fruit purées commonly introduced to infants' diets from the age of 6-7 months and fruit yoghurts from 8-12 months. It is important for infants and young children to eat a balanced diet including foods rich in iron. However, fortifying fruit purées and fruit yoghurts with iron may make them sensitive to undesirable colour changes. It is therefore advantageous that the use of desferrichrysin according to the current invention prevents colour change in fruit purées and fruit yoghurts fortified with iron.

A further aspect of the invention is a process for fortifying a food product with iron comprising preparing a non-beverage food product containing culinary fruit and adding ferrichrysin. Such a process has the advantage of producing a iron fortified product which, despite containing culinary fruit, may be less sensitive to colour change, for example the colour change due to iron interacting with phenolic chromophore compounds leading to bathochromic shifts. The process for fortifying the food product with iron may further comprise a heat treatment step, for example heat treatment to reduce or eliminate food spoilage organisms.

Those skilled in the art will understand that they can freely combine all features of the present invention disclosed herein. In particular, features described for the product of the present invention may be combined with the method of the present invention and vice versa. Further, features described for different embodiments of the present invention may be combined. Where known equivalents exist to specific features, such equivalents are incorporated as if specifically referred to in this specification. Further advantages and features of the present invention are apparent from the non-limiting examples.

EXAMPLES

Iron Fortified Strawberry-Banana Yoghurt

Commercial yoghurt, Nestlé Jogolino™ Strawberry/Banana yoghurt containing 15% banana puree and 10% strawberry puree was iron fortified by the addition of different iron salts to 5 kg yoghurt as reported in the table below. The amounts were chosen to provide approximately 0.8 mg iron per 100 g yoghurt. Ferrous sulphate, ferric sodium EDTA and ferric pyrophosphate were obtained from Dr Paul Lohmann™; ferrichrysin was obtained from Genaxxon Bioscience. The yoghurts were flash pasteurized at 105° C. for 2 minutes. Colour measurements were performed in 1×1 cm polystyrene cuvettes using an X-Rite ColorEye 7000A colorimeter. The colorimeter was set up with a D65 light source, 10 degree observer angle and with specular component included. The colour difference between the yoghurt with no iron salts and the iron fortified yoghurt was measured for each iron salt and expressed as ΔEab* using the CIELAB colour scale.

| Trial No | Fe Salt | % Fe | Amount (mg) | ΔEab* |
|---|---|---|---|---|
| 1 | $FeSO_4 \times H_2O$ | 32.0 | 124.3 | 4.74 |
| 2 | $NaFeEDTA \times H_2O$ | 12.5 | 318.0 | 3.11 |
| 3 | $Fe_4(P_2O_7)_3 \times H_2O$ | 24.0 | 165.6 | 3.43 |
| 4 | Ferrichrysin | 4.6 | 863.5 | 1.57 |

The yoghurt fortified with ferrichrysin had the closest colour to the yoghurt with no added iron.

70 g samples of the fortified yoghurt samples described above were placed in 100 mL glass jars and stored at 37° C. for 120 days. Colour measurements were performed at a range of time intervals. The colour difference between the colour of the stored yoghurts and their colour as measured immediately after pasteurization was calculated for each yoghurt sample and is reported in the table below.

| | | ΔEab* | | | |
|---|---|---|---|---|---|
| Trial No | Fe Salt | day 7 | day 30 | day 60 | day 120 |
| 0 | None | 0.75 | 1.97 | 3.77 | 6.83 |
| 1 | $FeSO_4 \times H_2O$ | 0.78 | 3.27 | 5.91 | 10.34 |
| 2 | $NaFeEDTA \times H_2O$ | 0.96 | 4.16 | 6.93 | 9.37 |
| 3 | $Fe_4(P_2O_7)_3 \times H_2O$ | 1.09 | 3.61 | 6.21 | 10.23 |
| 4 | Ferrichrysin | 1.03 | 1.32 | 3.77 | 6.46 |

The colour change over time for the yoghurt fortified with ferrichrysin was smaller than the yoghurts fortified by the other iron salts. Indeed, the yoghurt fortified with ferrichrysin had a similar colour change to the unfortified yoghurt over the 120 day period.

The invention claimed is:

1. A non-beverage food composition comprising desferrichrysin, iron, phenolic chromophore compounds and culinary fruit selected from the group consisting of blackcurrant, cranberry, elderberry, red currant, boysenberry, grape, cherry, orange, lemon, lime, mandarin, tangerine, grapefruit, pineapple, mango, *papaya*, passion fruit, kiwifruit, guava, fig, date, apple, plum, strawberry, raspberry, blueberry, blackberry, apricot, pear, banana, quince, wolfberry and mixtures thereof.

2. The non-beverage food composition according to claim 1 wherein the desferrichrysin is in the form of ferrichrysin, being complexed with iron.

3. The non-beverage food composition according to claim 1 wherein the phenolic chromophore compounds are selected from the group consisting of curcumin; carminic acid; polyphenols; and mixtures thereof.

4. The non-beverage food composition according to claim 1 wherein the ΔEab* value of the food composition is less than 3 after a heat treatment of 2 minutes at 105° C.

5. The non-beverage food composition according to claim 1 wherein the phenolic chromophore compounds comprise anthocyanins.

6. The non-beverage food composition according to claim 1 wherein the food composition is red in color.

7. The non-beverage food composition according to claim 1 wherein the food composition comprises yoghurt.

8. A method for preventing color change in an iron fortified food product comprising a culinary fruit selected from the group consisting of blackcurrant, cranberry, elderberry, red currant, boysenberry, grape, cherry, orange, lemon, lime, mandarin, tangerine, grapefruit, pineapple, mango, *papaya*, passion fruit, kiwifruit, guava, fig, date, apple, plum, strawberry, raspberry, blueberry, blackberry, apricot, pear, banana, quince, wolfberry and mixtures thereof, the method comprising adding desferrichrysin to the iron fortified food product.

9. The method of claim 8 wherein the color change over the product's shelf-life is prevented.

10. The method of claim 8 wherein the color change during heat treatment of the product is prevented.

11. The method of claim 8 wherein the desferrichrysin is in the form of ferrichrysin, being complexed with iron.

12. The method of claim 8 wherein the iron fortified food product comprises anthocyanins.

13. The method of claim 8 wherein the iron fortified food product is a fruit purée or fruit yoghurt.

14. The method of claim 8 wherein the iron fortified food product is selected from the group consisting of a biscuit; cake; pastry product; a cereal bar; a breakfast cereal; an ice cream product; a dessert; a prepared meal; a nutritional supplement and a pet food product.

15. A process for fortifying a food product with iron, the process comprising:
preparing a non-beverage food product containing culinary fruit selected from the group consisting of blackcurrant, cranberry, elderberry, red currant, boysenberry, grape, cherry, orange, lemon, lime, mandarin, tangerine, grapefruit, pineapple, mango, *papaya*, passion fruit, kiwifruit, guava, fig, date, apple, plum, strawberry, raspberry, blueberry, blackberry, apricot, pear, banana, quince, wolfberry and mixtures thereof; and
adding ferrichrysin to the non-beverage food product.

16. The process of claim 15, wherein the non-beverage food product comprises the iron in an amount of at least 5 ppm.

17. The process of claim 15, wherein the ferrichrysin is at least 100 ppm of the non-beverage food product.

18. The process of claim 15, wherein the culinary fruit is 5 to 99.985 wt. % of the non-beverage food product.

19. The process of claim 15 further comprising adding phenolic chromophore compounds selected from the group consisting of curcumin, carminic acid, polyphenols, and mixtures thereof to the non-beverage food product separately from the culinary fruit.

20. The process of claim 19 wherein the phenolic chromophore compounds are between 0.0005 and 5 wt. % of the non-beverage food product.

* * * * *